United States Patent Office 2,986,588
Patented May 30, 1961

2,986,588
PROPYLENE DIMERIZATION
Richard M. Schramm, Berkeley, Calif., assignor to California Research Corporation, San Francisco, Calif., a corporation of Delaware
No Drawing. Filed Sept. 27, 1957, Ser. No. 686,568
4 Claims. (Cl. 260—683.15)

The present invention relates to catalytic synthesis of olefins, more particularly to the production of hexenes from propylene, and still more particularly to catalytic propylene dimerization to produce a hexene product comprising substantial amounts of those hexene isomers having octane numbers that are among the highest of the hexene isomers.

It is known that gaseous olefins can be polymerized at elevated temperatures with catalysts. However, the resulting complex olefinic mixtures generally do not comprise an extremely high percentage of one particular isomer, and particularly do not result in an extremely high yield of hexenes substantially comprising the higher octane number hexene isomers which are valuable as motor fuel components. It is an object of the present invention to provide a process that will give such a result.

In accordance with the present invention, propylene is heated in the presence of an alkali metal catalyst at a temperature of from about 100° F.–400° F., preferably from about 250° F.–350° F., for a period of time sufficient to dimerize at least a substantial amount of said propylene. If desired, the reaction may be carried out in the presence of a hydrocarbon solvent that is substantially inert under the conditions of the reaction, for example heptane.

The process of the present invention may be carried out at atmospheric pressure or at pressures up to about 100 atmospheres, preferably from about 10 to 70 atmospheres. Heretofore, it has been thought that higher pressures are necessary in order to obtain a satisfactory reaction rate; however, applicant has found otherwise and, therefore, is able to avoid the use of the more expensive high pressure equipment.

The term "alkali metal catalyst," as used herein, is intended to include lithium, sodium, potassium, rubidium, and cesium. Exceptionally good results may be obtained with potassium, rubidium, and cesium. The catalyst may be a liquid metal catalyst, metal in a film on an inert support, or a solid metal catalyst. Improved contacting may be obtained with the liquid catalyst by vigorous agitation of the catalyst-hydrocarbon mixture during contacting.

The reaction involved in the process of the present invention may be carried out in either batch or continuous operation to obtain a substantial yield of the desired propylene dimer. In continuous operation, the process may be carried out at a liquid hourly space velocity of about from 0.01 to 20 and preferably about from 0.1 to 5.

By the process of the present invention, hexene yields of above 90 mole percent based on propylene reacted may be obtained. With a potassium, rubidium or cesium catalyst a hexene product may be obtained that comprises substantial amounts of 4-methylpentene-1, which has one of the highest leaded octane numbers of the hexene isomers, and the yield of the less desired hexenes can be minimized.

The following examples will serve to further illustrate the process and advantages of the present invention.

Example 1

A mixture of 0.485 mole propylene, 0.06 mole potassium, and 95 ml. benzene was charged to a 250-ml. stirred reactor. It was then heated to 300° F. and held at that temperature for nine hours. The pressure at 300° F. was initially 410 p.s.i.g., dropping to 270 p.s.i.g. at the end of the nine hours. The following products were obtained:

| Product | Moles | Grams |
| --- | --- | --- |
| Propylene | 0.098 | |
| Propane | 0.075 | |
| Hexenes | 0.124 | |
| Insolubles | | 2.0 |

The hexene yield was 64 mole percent, based on propylene reacted.

Example 2

A mixture of 0.485 mole propylene, 0.06 mole potassium, and 95 ml. n-heptane was charged to a 250-ml. stirred reactor. It was then heated to 300° F. and held at that temperature for 12 hours. The pressure at 300° F. was initially 410 p.s.i.g., dropping to 320 p.s.i.g. at the end of the 12 hours. The following products were obtained:

| Product | Moles | Grams |
| --- | --- | --- |
| Propylene | 0.278 | |
| Propane | 0.011 | |
| Hexenes | 0.096 | |
| Insolubles | | 0.0 |

The hexene yield was 93 mole percent, based on propylene reacted.

Example 3

A mixture of 0.485 mole propylene, 0.06 mole potassium, and 95 ml. n-heptane was charged to a 250-ml. stirred reactor. It was then heated to 400° F. and held at that temperature for four hours. The pressure at 400° F. was initially 590 p.s.i.g., dropping to 400 p.s.i.g. at the end of the four hours. The following products were obtained:

| Product | Moles | Grams |
| --- | --- | --- |
| Propylene | 0.153 | |
| Propane | 0.077 | |
| Hexenes | 0.105 | |
| Insolubles | | 1.6 |

The hexene yield was 63 mole percent, based on propylene reacted.

Example 4

A mixture of 0.485 mole propylene, 0.008 mole cesium, and 95 ml. n-heptane was charged to a 250-ml. stirred reactor. It was then heated to 300° F. and held at that temperature for 12 hours. The pressure at 300° F. was initially 400 p.s.i.g., dropping to 270 p.s.i.g. at the end of the 12 hours. The following products were obtained:

| Product | Moles | Grams |
| --- | --- | --- |
| Propylene | 0.183 | |
| Propane | 0.004 | |
| Hexenes | 0.117 | |
| Insolubles | | 0.0 |

The hexene yield was 78 mole percent, based on propylene reacted. The composition of the hexene product was as follows:

| Compound: | Wt. percent of hexene product |
|---|---|
| 1-hexene | 3 |
| 2-hexene | 1 |
| 3-hexene | 2 |
| 2-methylpentene-2 | 2 |
| 4-methylpentene-1 | 68 |
| 4-methylpentene-2 | 24 |

*Example 5*

A catalyst prepared by dispersing nine grams of molten potassium on 430 grams of powdered potassium carbonate was charged to the reaction chamber of a high pressure continuous test unit. A feed consisting of 77 mole percent propylene and 23 pole percent propane was passed over this catalyst at 900 p.s.i.g., 320° F., and a liquid hourly space velocity of 0.2. An 80% conversion of the propylene to hexenes was obtained. The composition of the hexene product was as follows:

| Compound: | Wt. percent of hexene product |
|---|---|
| 1-hexene | 6 |
| 2-hexene | 1 |
| 3-hexene | 2 |
| 2-methylpentene-2 | 1 |
| 4-methylpentene-1 | 74 |
| 4-methylpentene-2 | 16 |

*Example 6*

Operation was continued in the same test unit and with the same feed stock using the catalyst from the previous example. At 900 p.s.i.g., 320° F., and a liquid hourly space velocity of 0.4, a 30% conversion of the propylene to hexenes was obtained. The composition of the hexene product was as follows:

| Compound: | Wt. percent of hexene product |
|---|---|
| 1-hexene | 8 |
| 2-hexene | 1 |
| 3-hexene | 1 |
| 2-methylpentene-2 | 1 |
| 4-methylpentene-1 | 80 |
| 4-methylpentene-2 | 9 |

It has been found that the dimerization reaction is more rapid in a benzene solvent than in a heptane solvent, but that the selectivity for dimerization is lower. In the benzene solvent as compared with the heptane solvent system, there is more hydrogenation of propylene to propane, and more solid product is formed. Much of the solid product probably is derived from the benzene. The hydrogen necessary to produce the larger quantities of propane in the benzene solvent system may have its source in a reaction of benzene to diphenyl.

The heptane used in the foregoing examples was n-heptane, which has been found to be nonreactive with potassium.

The hexenes in the product in the runs of the foregoing examples comprise substantial quantities of 4-methyl-pentene-1, which has one of the highest leaded octane numbers of the hexene isomers. In marked contrast with prior art processes wherein the dimerization product generally comprises substantial quantities of less desirable isomers, e.g., normal hexenes or 2-methylpentene-1, the process of the present invention can produce a total reaction product having 4-methylpentene-1 plus 4-methylpentene-2 content as high as about 90% and a normal hexene content as low as around 6%. With the process of the present invention, higher yields of higher octane polymer can be obtained from a given quantity of propylene than with prior art processes.

In continuous operation according to the process of the present invention, it may be preferable to operate the dimerization reactor at low conversions per pass and recycle unreacted propylene to the reactor, thereby improving product distribution and maximizing the concentration of the most desired hexene isomers, particularly 4-methylpentene-1, in the reaction product.

From the foregoing, it may be seen that the process of the present invention has high utility in the production in excellent yields of hexene isomers from propylene and that the hexene isomers produced comprise substantial quantities of the higher octane isomers.

It will be apparent to those skilled in the art that numerous changes could be made in the specific conditions and modes of operation set forth above without departing from the spirit of the present invention, and all such changes are intended to be included within the scope of the appended claims.

I claim:

1. A process for dimerizing propylene consisting of contacting in a catalytic polymerization zone, a normally gaseous propylene-containing feed substantially free from olefins other than propylene, with a catalyst consisting essentially of an alkali metal selected from the group consisting of potassium, rubidium and cesium at a temperature in the range of about 100° F. to about 400° F. and a pressure not greater than about 100 atmospheres, and removing a reaction product from said zone, the hexene fraction of said reaction product being principally 4-methylpentene-1.

2. The process of claim 1 in which the alkali metal catalyst is supported on potassium carbonate.

3. The process of claim 1 wherein the catalyst is potassium.

4. The process of claim 1 wherein the catalyst is potassium supported on potassium carbonate.

References Cited in the file of this patent

UNITED STATES PATENTS

| 2,492,693 | Freed | Dec. 27, 1949 |
| 2,691,647 | Field et al. | Oct. 12, 1954 |
| 2,795,631 | Nelson et al. | June 11, 1957 |
| 2,870,217 | Toland | Jan. 20, 1959 |
| 2,881,234 | Esmay et al. | Apr. 7, 1959 |